(12) United States Patent
Hellot et al.

(10) Patent No.: US 11,008,678 B2
(45) Date of Patent: May 18, 2021

(54) METHOD OF FABRICATING A TEXTILE STRUCTURE OF VARYING THICKNESS

(71) Applicants: SAFRAN AIRCRAFT ENGINES, Paris (FR); SAFRAN, Paris (FR)

(72) Inventors: Jérémy Hellot, Paris (FR); Dominique Marie Christian Coupe, Saint Fargeau Ponthierry (FR); Hubert Jean Marie Fabre, Melun (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 136 days.

(21) Appl. No.: 15/403,468

(22) Filed: Jan. 11, 2017

(65) Prior Publication Data
US 2017/0198420 A1 Jul. 13, 2017

(30) Foreign Application Priority Data
Jan. 11, 2016 (FR) ...................................... 1650197

(51) Int. Cl.
*D03D 3/08* (2006.01)
*B29B 11/16* (2006.01)
(Continued)

(52) U.S. Cl.
CPC ................ *D03D 3/08* (2013.01); *B29B 11/16* (2013.01); *B29C 70/24* (2013.01); *B29C 70/32* (2013.01);
(Continued)

(58) Field of Classification Search
CPC ...... D03D 3/005; D03D 3/08; D03D 15/0094; D03D 25/005; D03D 41/004; D03D 49/04;
(Continued)

(56) References Cited

U.S. PATENT DOCUMENTS 3,782,767 A * 1/1974 Moore .................... B60R 19/20
114/219
4,069,359 A * 1/1978 DeMarse ............ B29C 37/0075
138/112
(Continued)

FOREIGN PATENT DOCUMENTS

EP 1 961 923 A2 8/2008
WO WO 2015/136213 A1 9/2015

OTHER PUBLICATIONS

Search Report as issued in French Patent Application No. 1650197, dated Oct. 4, 2016.

*Primary Examiner* — Megha M Gaitonde
(74) *Attorney, Agent, or Firm* — Pillsbury Winthrop Shaw Pittman LLP

(57) ABSTRACT

A method of fabricating a textile structure of varying thickness including using a loom to weave a fiber texture in the form of a strip extending lengthwise along a longitudinal axis and widthwise along an axis perpendicular to the longitudinal axis, and causing the texture to be wound under tension onto a mandrel. The texture includes a portion presenting extra thickness. During the winding of the texture, a spacer element is interposed between adjacent turns of the fiber texture onto the mandrel. Each spacer element extends in the width direction of the texture over a portion thereof situated outside the portion of extra thickness and presenting, over the portion of the texture situated outside the portion of extra thickness, a thickness that corresponds at least to the difference between thicknesses of the portion of extra thickness and of the portion of the texture situated outside the portion of extra thickness.

11 Claims, 6 Drawing Sheets

(51) Int. Cl.
  *D03D 25/00* (2006.01)
  *D03D 41/00* (2006.01)
  *D03D 49/20* (2006.01)
  *B29C 70/32* (2006.01)
  *B29C 70/24* (2006.01)
  B29C 70/22 (2006.01)
  B29L 31/30 (2006.01)
  B29L 31/00 (2006.01)

(52) U.S. Cl.
  CPC ......... *D03D 25/005* (2013.01); *D03D 41/004* (2013.01); *D03D 49/20* (2013.01); *B29C 70/222* (2013.01); *B29L 2031/3076* (2013.01); *B29L 2031/7504* (2013.01); *B65H 2301/4127* (2013.01); *B65H 2301/414324* (2013.01)

(58) Field of Classification Search
  CPC ... B29C 53/805; B29C 53/8058; B29C 70/06; B29C 70/08; B29C 70/088; B29C 70/222; B29C 70/34; B29C 70/347; B29C 70/40; B29L 2031/3076; B29L 2031/7504; B65H 2301/4127; B65H 2301/414324; Y10T 428/24058; Y10T 428/24074; Y10T 428/24124; Y10T 428/24132; Y10T 428/24149; Y10T 428/24355; Y10T 428/24479; Y10T 428/24496; Y10T 428/24504; Y10T 428/24521; Y10T 428/24537; Y10T 428/24545; Y10T 428/2457; Y10T 428/24603; Y10T 428/24942; Y10T 428/2495
  USPC ..... 139/311, 384 R; 428/114, 116, 141, 147, 428/148, 156, 158, 159, 161, 163, 164, 428/167, 171, 212, 213
  See application file for complete search history.

(56) References Cited

U.S. PATENT DOCUMENTS

| | | |
|---|---|---|
| 4,600,619 A | 7/1986 | Chee et al. |
| 2013/0164473 A1 | 6/2013 | Feeney et al. |
| 2017/0198421 A1* | 7/2017 | Hellot .................. D03D 25/005 |

* cited by examiner

METHOD OF FABRICATING A TEXTILE STRUCTURE OF VARYING THICKNESS

CROSS-REFERENCE TO RELATED APPLICATION

This application claims priority to French Patent Application No. 1650197, filed Jan. 11, 2016, the entire content of which is incorporated herein by reference in its entirety.

FIELD

The present invention relates to a method of fabricating a textile structure of varying thickness that can be used particularly, but not exclusively, to form the fiber reinforcement of an aeroengine fan casing made of composite material (fiber reinforcement densified by a matrix).

BACKGROUND

As shown in FIG. 1, such a textile structure is made from a fiber texture 500 obtained by three-dimensional weaving between a plurality of layers of warp yarns or strands extending in the longitudinal direction of the texture, the warp yarns or strands being interlinked by weft yarns or strands extending in the transverse direction of the texture. On leaving the loom, the fiber texture presents a portion 501 of extra thickness, and a portion 502 of smaller thickness. The fiber texture 500 is woven to have a "shape", i.e. the ratio between the lengths of the warp yarns or strands is adapted to the profile of the final part. The portion 501 of extra thickness is made using warp yarns or strands having a size or weight that is greater in this portion of the fiber texture than in the portion 502. On leaving the loom, the fiber texture is wound on a storage mandrel 550 so as to be transported subsequently to a winding machine for winding the fiber texture once more, this time onto an injection mold.

The fiber texture 500 is wound under tension on the mandrel 550. This winding under tension serves firstly to apply low take-up tension on the warp yarns or strands for weaving, and secondly to apply high tension for the winding as is needed for compacting the preform. The tension exerted by the mandrel 550 on the fiber texture 500 should preferably be constant throughout weaving so as to avoid undesirable stresses and deformations in the texture.

In order to keep a constant and uniform tension on the fiber texture throughout weaving, it is necessary to have control over the length of the warp yarns or strands that are taken up in the weaving. Unfortunately, when the fiber texture for winding presents varying thickness, it becomes difficult to control the lengths of the warp yarns or strands as winding continues. As shown in FIG. 2, the take-up length of the warp yarns or strands 510a present in the portion 501 of extra thickness increases more quickly with increasing number of winding turns than does the take-up length of the warp yarns or strands 510b present in the portion 502 of smaller thickness. Consequently, the ratio L510a/L510b between the length L510a of the warp yarns or strands 510a situated in the portion 501 of extra thickness and the length L510b of the warp yarns or strands 510b situated in the portion 502 does not remain constant throughout weaving and winding the fiber texture 500.

SUMMARY

An aspect of the invention seeks to avoid such drawbacks, and for this purpose it proposes a method of fabricating a textile structure of varying thickness comprising using a loom to weave a fiber texture in the form of a strip extending lengthwise along a longitudinal axis and widthwise along an axis perpendicular to the longitudinal axis, and causing the fiber texture leaving the loom to be wound under tension onto a mandrel, the fiber texture including at least one portion presenting extra thickness, wherein during the winding of the fiber texture onto the mandrel, at least one spacer element is interposed between adjacent turns of the fiber texture on the mandrel, each spacer element extending in the width direction of the fiber texture over one or more portions of the texture situated outside the at least one portion of extra thickness and presenting, over the portion(s) of the texture situated outside the at least one portion of extra thickness, a thickness that corresponds at least to the difference between the thickness of the at least one portion of extra thickness and the thickness of the portion(s) of the texture situated outside the at least one portion of extra thickness.

Thus, the method of an embodiment of the invention makes it possible to compensate for the thickness variation present in the fiber texture while it is being wound, thereby avoiding any increase in the take-up length of the warp yarns or strands in the portion of extra thickness compared with the take-up length of the warp yarns or strands present in the portion(s) of texture situated outside the portion of extra thickness. Consequently, the ratio between the length of the warp yarns or strands present in the portion of extra thickness and the length of the warp yarns or strands present in the portion(s) situated outside the portion of extra thickness remains constant throughout weaving and winding of the fiber texture.

In an aspect of the method of the invention, a spacer element is interposed between adjacent turns of the fiber texture on the mandrel, the spacer element extending over only the width of the portion(s) of smaller thickness or else over the entire width of the fiber texture. When extending over the entire width, the portion(s) of the spacer element situated on the portion(s) of extra thickness of the fiber texture present(s) thickness(es) smaller than the thickness(es) of the portion(s) of the spacer element situated on the portion(s) of smaller thickness of the fiber texture.

According to a particular characteristic of the method of the invention, each spacer element is constituted by a cellular structure. The cellular structure may be made of a deformable material, such as embossed rubber or paper or card which then includes a layer of impermeable coating so as to avoid absorbing water. It could also be made of a metal material. Under such circumstances, each face of the cellular structure is, in an embodiment, covered by a skin or deformable material so as to avoid damaging the fibers of the texture that come into contact with the edges of the cell walls.

According to another particular characteristic of the method of the invention, each spacer element is constituted by a textile strip. Each textile strip may be woven at the same time as the fiber texture. Each textile strip may beneficially present a weave similar to the weave of the fiber texture, thereby enabling it to have deformation characteristics that are similar to those of the fiber texture.

An aspect of the invention also provides a textile structure of varying thickness comprising a fiber texture wound on a mandrel and including at least one portion presenting extra thickness, wherein at least one spacer element is interposed between adjacent turns of the fiber texture on the mandrel, each spacer element extending in the width direction of the fiber texture over at least one or more portions of the texture situated outside side at least one portion of extra thickness and presenting, over the portion(s) of the texture situated outside the at least one portion of extra thickness, a thickness that corresponds at least to the difference between the thickness of the at least one portion of extra thickness and the thickness of the portion(s) of the texture situated outside the at least one portion of extra thickness.

In an aspect of the textile structure of the invention, a spacer element is interposed between adjacent turns of the fiber texture on the mandrel, the spacer element extending over only the width of the portion(s) of smaller thickness or else over the entire width of the fiber texture. When extending over the entire width, the portion(s) of the spacer element situated on the portion(s) of extra thickness of the fiber texture present(s) thickness(es) smaller than the thickness(es) of the portion(s) of the spacer element situated on the portion(s) of smaller thickness of the fiber texture.

According to a particular characteristic of the textile structure of the invention, each spacer element is constituted by a cellular structure. The cellular structure may be made of a deformable and impermeable material, such as embossed rubber or paper or card which then includes a layer of impermeable coating so as to avoid absorbing water. It could also be made of a metal material. Under such circumstances, each face of the cellular structure is, in an embodiment, covered by a skin or deformable material so as to avoid damaging the fibers of the texture that come into contact with the edges of the cell walls.

According to another particular characteristic of the textile structure of the invention, each spacer element is constituted by a textile strip. Each textile strip may be woven at the same time as the fiber texture. Each textile strip may beneficially present a weave similar to the weave of the fiber texture, thereby enabling it to have deformation characteristics that are similar to those of the fiber texture.

BRIEF DESCRIPTION OF THE DRAWINGS

Other characteristics and benefits of the invention appear from the following description of particular implementations of the invention given as non-limiting examples and with reference to the accompanying drawings, in which.

DETAILED DESCRIPTION

The invention applies in general to fabricating textile structures obtained from woven fiber textures including at least one portion of extra thickness and that wound onto a mandrel on leaving a loom, the fiber textures being made by three-dimensional weaving between a plurality of layers of warp yarns or strands and a plurality of layers of weft yarns or strands.

Figure 1:
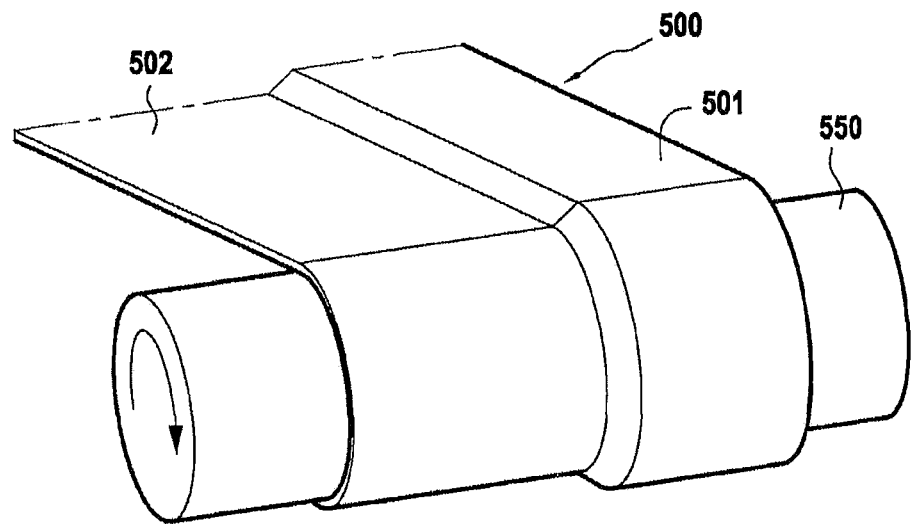
FIG. 1 is a diagrammatic perspective view showing a fiber texture of varying thickness being wound on a storage mandrel in the prior art.
Figure 2:
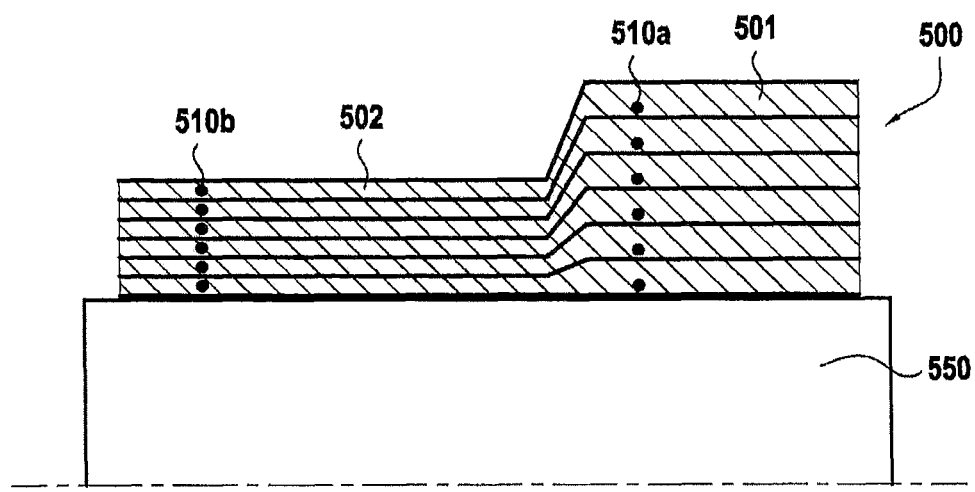
FIG. 2 is a diagrammatic section view showing the textile structure obtained after winding the FIG. 1 fiber texture.
Figure 3:
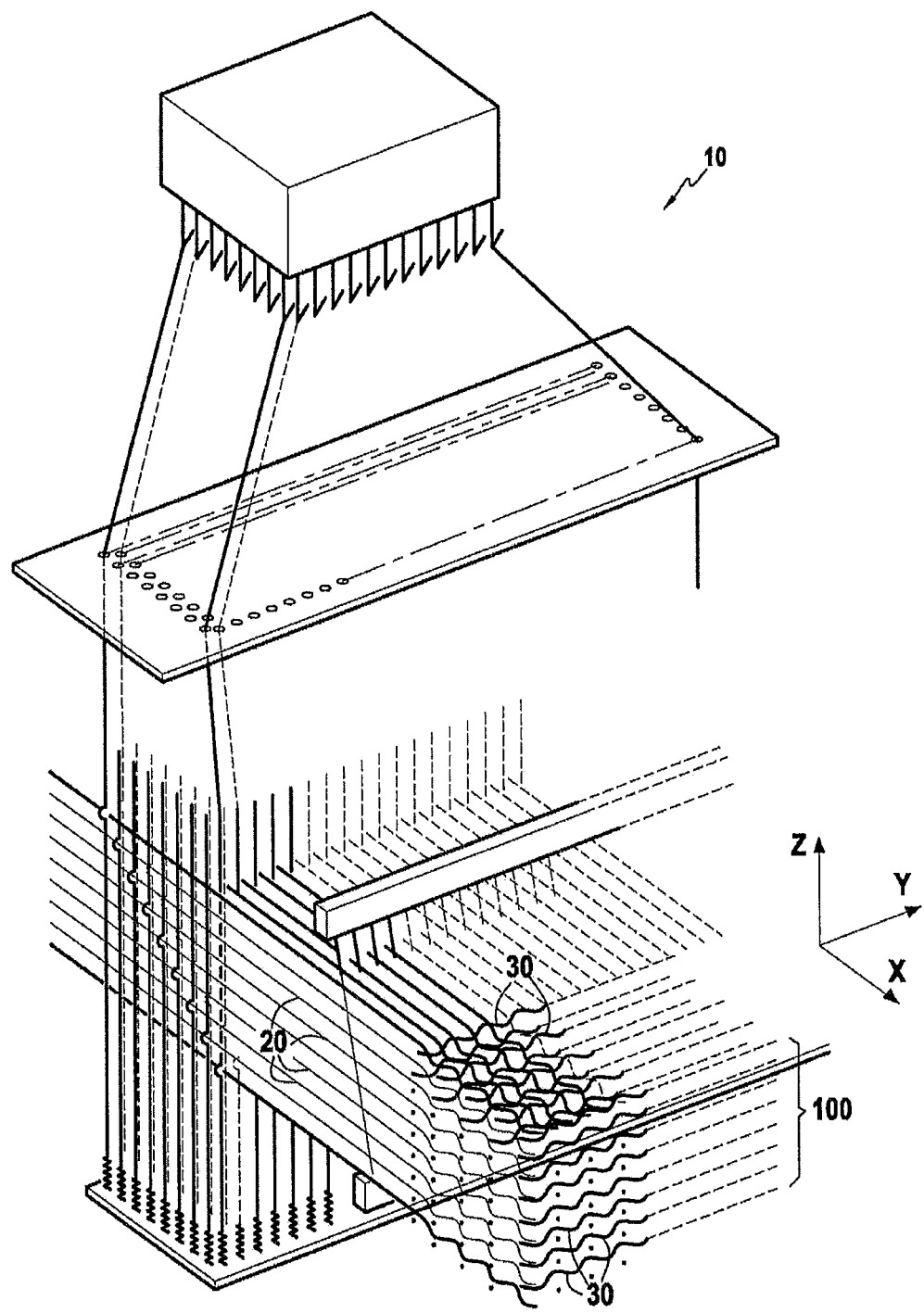
FIG. 3 is a diagrammatic perspective view of a loom showing the weaving of a fiber texture of varying thickness.

As shown in FIG. 3, a fiber texture 100 is made in known manner by weaving using a Jacquard type loom 10 having arranged thereon a bundle of warp yarns or strands 20 organized as a plurality of layers, the warp yarns being interlinked by weft yarns or strands 30. The fiber texture is made by three-dimensional weaving. The term "three-dimensional weaving" or "3D weaving" is used herein to mean weaving whereby at least some of the weft yarns interlink warp yarns over a plurality of layers of warp yarns, or vice versa. An example of three-dimensional weaving is weaving using the interlock weave. The term "interlock weave" is used herein to mean a weave in which each layer of weft yarns interlinks a plurality of layers of warp yarns, with all of the yarns in the same weft column having the same movement in the weave plane.

Figure 4:
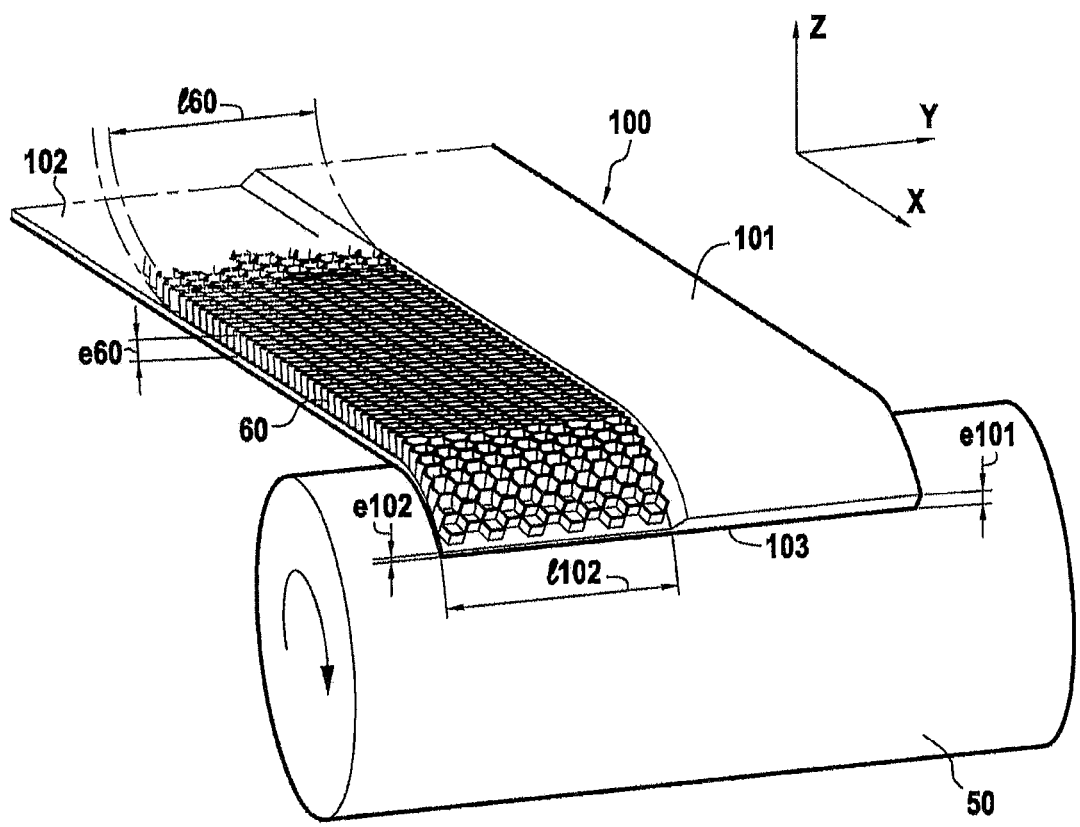
FIG. 4 is a diagrammatic perspective view showing the fiber texture leaving the FIG. 3 loom and being wound on a storage mandrel in accordance with an implementation of the method of the invention.

As shown in FIGS. 3 and 4, the fiber texture 100 is in the form of a strip that extends lengthwise in a direction X corresponding to the travel direction of the warp yarns or strands 20 and widthwise or transversely in a direction Y corresponding to the direction of the weft yarns or strands 30.

As shown in FIG. 4, the fiber texture 100 has a portion of extra thickness 101 that forms a thickness variation relative to the portion 102 of the texture lying outside the portion 101. The portion of extra thickness 101 is obtained by using warp yarns or strands in this portion of the texture that are of greater size or weight than those in the portion 102. On leaving the loom 10, the fiber texture 100 is wound onto a storage mandrel 50. The fiber texture 100 is wound under tension on the mandrel 50. For this purpose, the end 103 of the fiber texture is fastened to the mandrel 50, which is coupled to a rotary drive system (not shown in FIG. 4). This winding under tension serves firstly to apply low take-up tension on the warp yarns or strands for weaving, and secondly high winding tension needed for compacting the preform. The tension exerted by the mandrel 50 on the fiber texture 100 is, in an embodiment, constant throughout its weaving.

In accordance with an embodiment of the invention, and as shown in FIG. 4, the spacer element, a cellular structure 60 in this example, is placed on the fiber texture 100 from beginning of winding over the portion 102 of the texture that lies outside the portion 101. The cellular structure 60 is in the form of a strip that presents a width 160 extending in the direction Y corresponding to the axis of the mandrel 50 and that matches the width 1102 over which the portion 102 extends. The length of the cellular structure extending in the direction X is determined as a function of the length of the fiber texture 100 that is to be wound on the mandrel 50. The cellular structure 60 presents thickness e60 that corresponds to the difference between the thickness e101 of the portion 101 of extra thickness and the thickness e102 of the portion 102 of the texture that lies outside the portion 101, so as to fill in the thickness variation between the portions 101 and 102 while winding the fiber texture.

Figure 5:
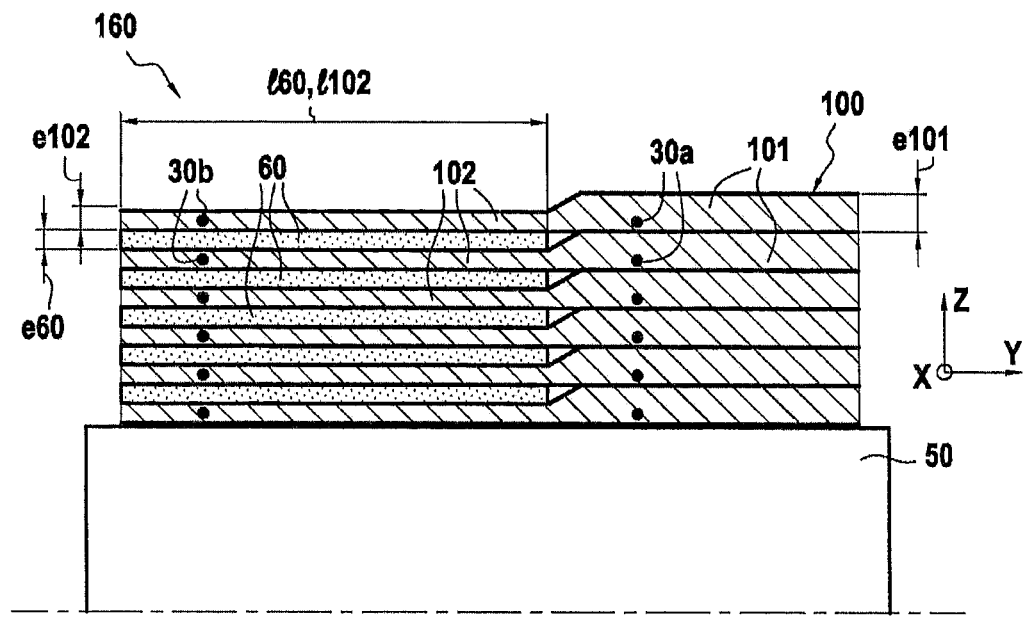
FIG. 5 is a diagrammatic section view showing a textile structure obtained after winding the FIG. 4 fiber texture.

FIG. 5 shows a textile structure 160 that results from winding a plurality of turns (six turns in the example shown) of the fiber texture 100 on the mandrel 50 with the cellular structure 60 interposed between adjacent turns of the texture 100, as described above. It can be seen that by interposing the cellular structure 60, the warp yarns or strands present in each winding turn of the fiber texture 100 lie at the same level in the thickness direction Z of the textile structure. More precisely, a warp yarn or strand 30a situated in the portion 101 of extra thickness is to be found at each winding turn at the same level as a warp yarn or strand 30b situated in the portion 102 of the texture situated outside the portion 101. Consequently, the ratio L30a/L30b between the length L30a of the warp yarns or strands 30a situated in the portion 101 of extra thickness and the length L30b of the warp yarns or strands 30b situated in the portion 102 remains constant throughout the weaving and the winding of the fiber texture 100.

Figure 6:
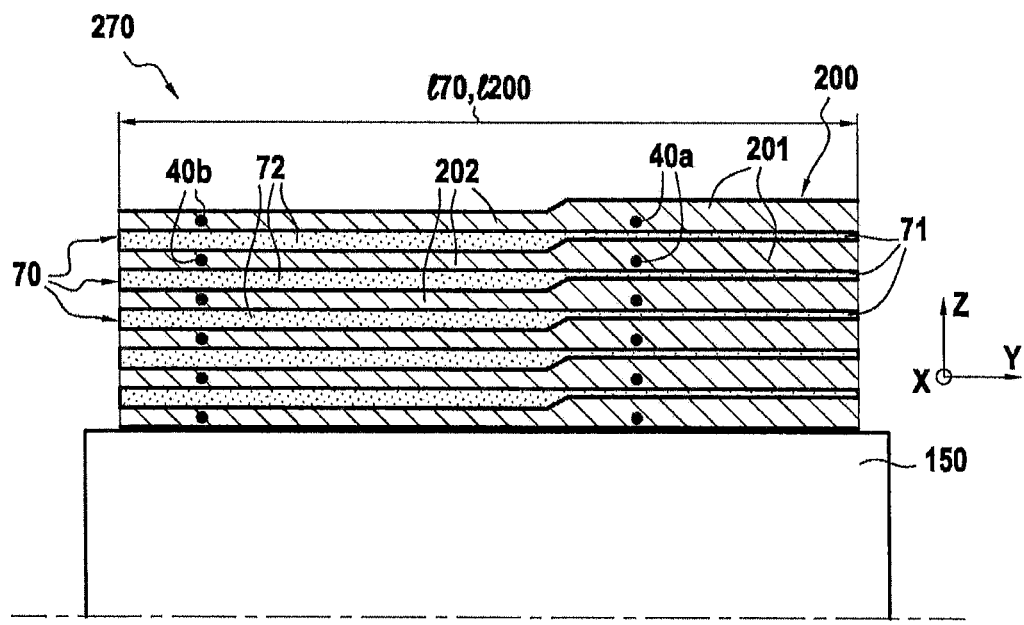
FIG. 6 is a diagrammatic section view showing a textile structure obtained after winding a woven fiber texture in accordance with another implementation of the method of the invention.

In a variant implementation of the method, the spacer element may extend over the entire width of the fiber texture. FIG. 6 shows a textile structure 270 having a fiber texture 200 that is obtained like the above-described fiber texture 100 by three-dimensional weaving in a loom and that is wound under tension on a storage mandrel 150. The fiber texture 200 has a portion 201 of extra thickness that forms a thickness variation with a portion 202 of the texture situated outside the portion 201. A spacer element, in this example a cellular structure 70, is interposed between adjacent turns of the fiber texture 200 in the same manner as that described above. The cellular structure 70 is in the form of a strip that extends over a width l70 corresponding to the width l200 of the texture 200. The cellular structure 70 presents a thickness that varies between a first portion 71 situated on the portion 201 of extra thickness of the texture 200, and a second portion 72 situated on the portion 202 of the texture 200 that is situated outside the portion 201. Since the cellular structure 70 is complementary in shape to the fiber texture 200, the warp yarns or strands present in each winding turn of the fiber texture 100 are all at the same level in the thickness direction Z of the textile structure. The ratio L40a/L40b between the length L40a of the warp yarns or strands 40a situated in the portion 201 of extra thickness and the length L40b of the warp yarns or strands 40b situated in the portion 202 remains constant throughout weaving and winding the fiber texture 200.

The use of a cellular structure as a spacer element is beneficial in that it is easily deformable around the mandrel while presenting good ability to withstand compression in the thickness direction. It also presents low density. The cellular structure is easy to machine with varying shapes in order to match the shape and/or the thickness variation of the fiber texture. The shape of the cells in the structure may be adapted as a function of the radius of the storage mandrel (hexagonal cells (honeycomb), rectangular cells, multilobed cells, etc.).

Figure 7:
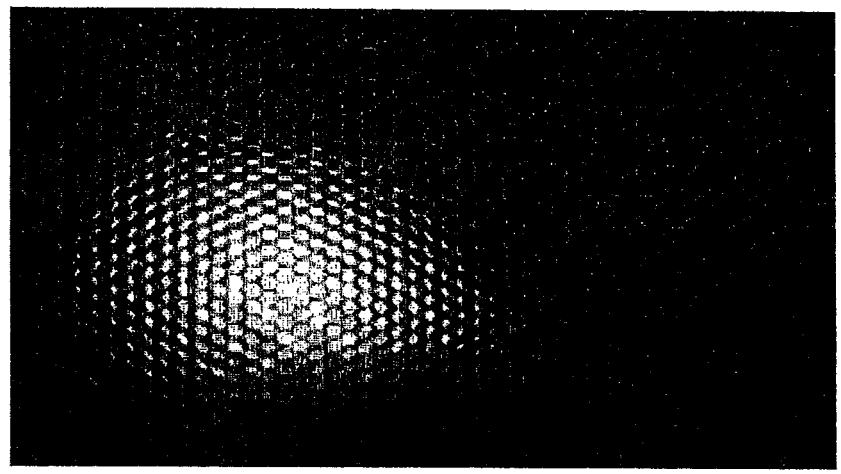
FIGS. 7 and 8 show respective cellular structures suitable for use as spacer elements in the method of the invention.
Figure 8:
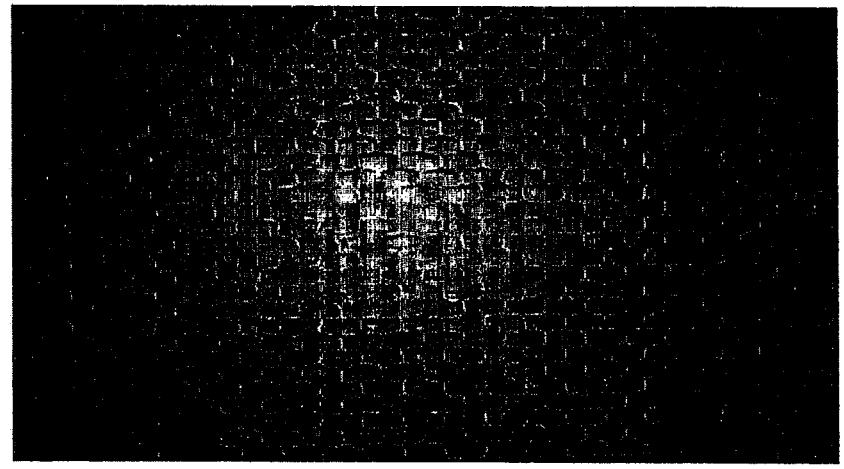
Figure 9:
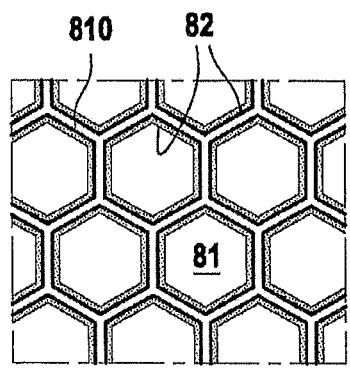
FIG. 9 is a diagrammatic view showing a cellular structure made of paper or card material in which the cell walls are covered by an impermeable material.
Figure 10:
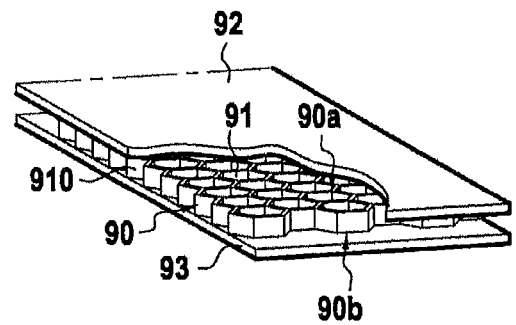
FIG. 10 is a diagrammatic perspective view of a cellular structure made of metal material having its faces covered with a protective skin of deformable material.

As described above, the spacer element may be formed by a cellular structure. The cellular structure may in particular be of the honeycomb type as shown in FIG. 7 or it may have cells of rectangular shape as shown in FIG. 8. The cellular structure may be made out of a deformable material such as embossed rubber, or such as paper or card covered in a layer of impermeable material, like the structure 80 shown in FIG. 9. When the walls 810 of the cells 81 of the cellular structure 80 are made of paper or card, the walls 810 may be covered in an impermeable coating 82 so as to prevent the walls 810 absorbing water. The cellular structure may also be made out of a metal material like the structure 90 shown in FIG. 10. Under such circumstances, each of the two faces 90a and 90b of the cellular structure 90 is covered by a respective skin 92 or 93 made of deformable material, e.g. an elastomer, so as to prevent the sharp edges of the walls 910 of the cells 91 of the cellular structure coming into contact with the fiber texture, since such contact could damage the fiber texture.

Figure 11:
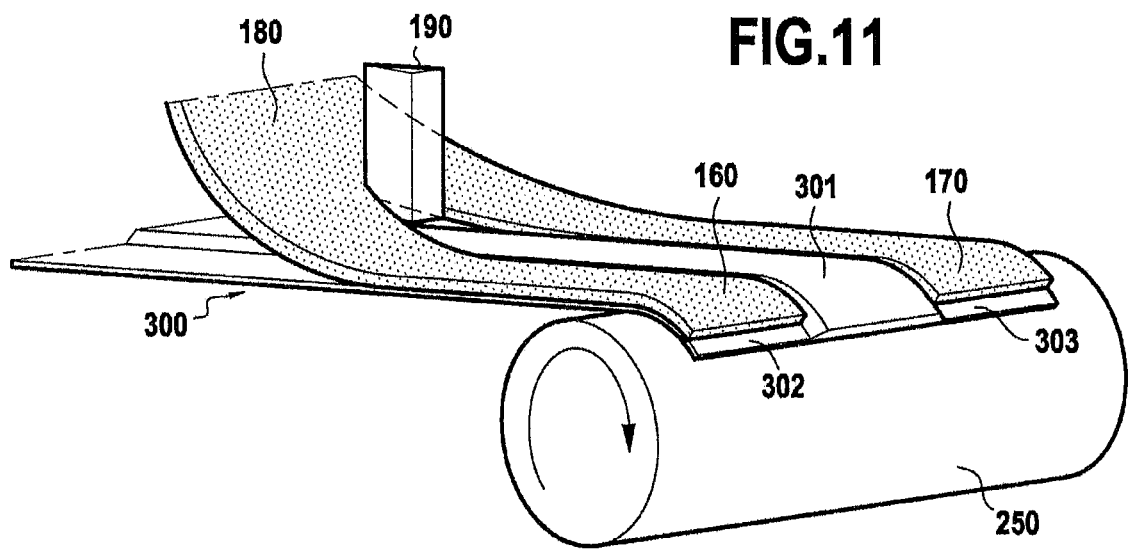
FIG. 11 is a diagrammatic perspective view showing a fiber texture leaving a loom being wound onto on a storage mandrel in accordance with another implementation of the method of the invention.

The spacer element could also be constituted by a textile strip obtained by two-dimensional or three-dimensional weaving. In FIG. 11, on leaving the loom, a fiber texture 300 obtained by three-dimensional weaving is wound under tension onto a storage mandrel 250. The fiber texture 300 has a portion 301 of extra thickness that forms thickness variations with two portions 302 and 303 situated on either side of the portion 301. In order to fill in the difference in thickness between these portions while winding the texture 300 onto the mandrel 250, a first textile strip 160 is placed on the portion 302 of the fiber texture 300 from the beginning of winding, while a second textile strip 170 is likewise placed on the portion 303 of the fiber texture 300 from beginning of winding. The textile strips 160 and 170 present widths that match the respective width occupied by the portions 302 and 303 of the texture situated outside the portion 301 of extra thickness. The length of the textile strips 160 and 170 is determined as a function of the length of the fiber texture 300 that is to be wound onto the mandrel 250. The textile strips 160 and 170 present respective thicknesses that correspond to the differences between the thickness of the portion 301 of extra thickness and the respective thicknesses of the portions 302 and 303 so as to fill in the thickness variations between each of the portions 302 and 303 and the portion 301 of extra thickness.

The textile strips 160 and 170 may be woven individually and laid respectively on the portions 302 and 303 by using a guide (not shown in FIG. 11). In a variant of the implementation shown in FIG. 11, the textile strips 160 and 170 are obtained from a single strip 180 that is cut in two by a cutter device 190, e.g. an ultrasound cutter device, the textile strips 160 and 170 then being laid respectively on the portions 302 and 303 by a guide (not shown in FIG. 11). The textile strips 160 and 170 or the strip 180 from which these two strips are taken may be woven at the same time as the fiber texture 300 on the same loom as is used for weaving the texture 300, or on a different loom.

In a variant implementation, the textile strips 160 and 170 may be replaced by cellular structures of widths that correspond respectively to the widths occupied by the portions 302 and 303 of the texture lying outside the portion 301 of extra thickness, and of thicknesses corresponding to the differences between the thickness of the portion 301 of extra thickness and the respective thicknesses of the portions 302 and 303 so as to fill in the thickness variation between each of the portions 302 and 303 and the portion 301 of extra thickness.

Figure 12:
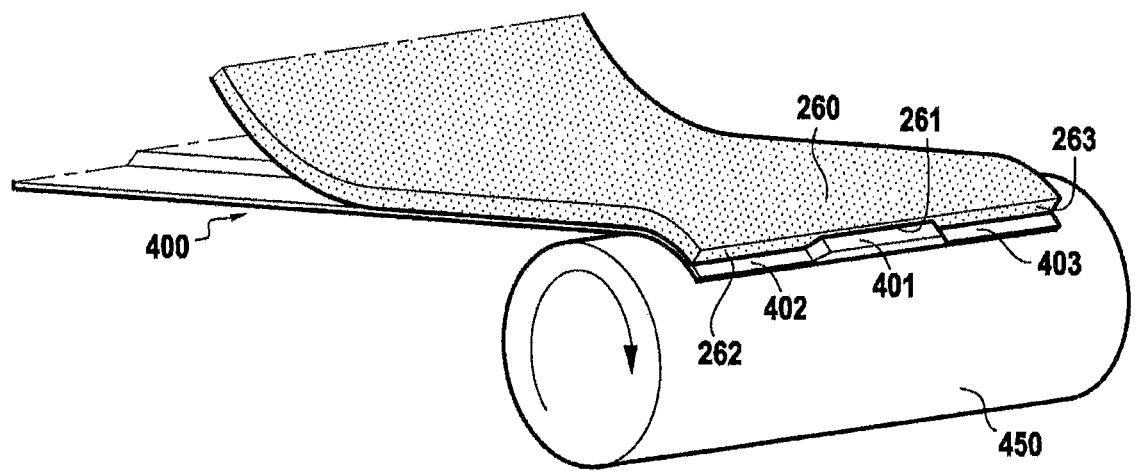
FIG. 12 is a diagrammatic perspective view showing a fiber texture leaving a loom being wound onto a storage mandrel in accordance with another implementation of the method of the invention.

FIG. 12 shows the situation in which a textile strip is used as a spacer covering the entire width of the fiber texture. More precisely, on leaving the loom, the fiber texture 400 obtained by three-dimensional weaving is wound under tension onto a storage mandrel 450. The fiber texture 400 has a portion 401 of extra thickness that forms thickness variations with two portions 402 and 403 situated on either side of the portion 401. In order to fill in the thickness differences between these portions while winding the texture 300 on the mandrel 450, the textile strip 260 presents a shape that is complementary, i.e. a portion 261 of reduced thickness in its center and two portions 262 and 263 of extra thickness situated on either side of the portion 261, is placed on the fiber texture 300 from the start of winding. The portion 261 presents a width corresponding to the width occupied by the portion 401 of extra thickness of the fiber texture 400, while each of the portions 262 and 263 presents a respective width corresponding to the width occupied by each of the portions 402 and 403 situated on either side of the portion 401. The length of the textile strip 260 is determined as a function of the length of the fiber texture 400 that is to be wound onto the mandrel 450. The portion 261 presents a thickness that corresponds substantially to the thickness of the portions 402 and 403 situated on either side of the portion 401 of the fiber texture 400, while the portions 262 and 263 present thickness that correspond substantially to the thickness of the portion 401 of extra thickness of the fiber texture 400.

In a variant implementation, the textile strip 260 may be replaced by a cellular structure presenting a width corresponding to the width of the fiber texture 400, the cellular structure having a central portion that, like the portion 261, presents a width corresponding to the width occupied by the portion 401 of extra thickness of the fiber texture 400 and a thickness corresponding substantially to the thickness of the portions 402 and 403 situated on either side of the portion 401 of the fiber texture 400, and two portions situated on either side of the central portion that, like the portions 262 and 263, present respective widths corresponding to the widths occupied by the portions 402 and 403 and a thickness that corresponds substantially to the thickness of the portion 401 of extra thickness of the fiber texture 400.

The use of a textile strip as a spacer element is beneficial in that it can be made to have the same textile characteristics as the fiber texture that is to be wound, so that its deformation properties are then similar to those of the fiber texture. The fiber strip(s) may in particular be made using the same weave as the fiber texture for winding so as to present deformation characteristics that are similar to those of the fiber texture. The fiber texture and the fiber strip(s) used for spacing purposes may present the same weave obtained by three-dimensional or multilayer weaving. The terms "three-dimensional weaving" or "3D weaving" or indeed "multi-layer weaving" are used herein to mean weaving in which at least some of the weft yarns interlink warp yarns over a plurality of layers of warp yarns, or vice versa, using a weave that may in particular be selected from among the following weaves: interlock, multi-plain, multi-satin, and multi-trill. The fiber strip(s) may also be made of low density fibers with good traction strength in order to obtain a spacer element of lighter weight. As non-limiting examples, the fiber strip(s) may be in the form of thick aerated fabrics of rep weave type made from extruded polyamide or polyester (PES) string.

The spacer element(s) used in the method of the invention for compensating the thickness difference in the fiber texture while it is being wound may be made using elements other than cellular structures or woven strips. In general manner, any element presenting at least the following properties can be used:
- ability to deform to fit around the storage mandrel;
- incompressible, or hardly compressible, under the tensions applied during weaving;
- resistant to moisture; and
- no risk of damaging the fibers of the texture.

The invention claimed is:

1. A method of fabricating a textile structure of varying thickness comprising using a loom to weave a fiber texture in the form of a strip extending lengthwise along a longitudinal axis and widthwise along an axis perpendicular to the longitudinal axis, and causing the fiber texture leaving the loom to be wound under tension onto a mandrel, the fiber texture including at least one portion presenting extra thickness, wherein during the winding of the fiber texture onto the mandrel, at least one spacer element is interposed between adjacent turns of the fiber texture on the mandrel, each spacer element extending in a width direction of the fiber texture over at least one or more portions of the texture situated outside said at least one portion of extra thickness and presenting, over the portion(s) of the texture situated outside said at least one portion of extra thickness, a thickness that corresponds at least to a difference between a thickness of said at least one portion of extra thickness and a thickness of the portion(s) of the texture situated outside said at least one portion of extra thickness, wherein each spacer element presents a first portion situated on, and covering, said at least one portion of extra thickness of the fiber texture, the first portion having a first constant thickness along a width of the first portion that is perpendicular to a longitudinal length of the spacer, and a second portion situated on, and covering, the portion of the fiber texture that is situated outside said at least one portion of extra thickness, the second portion having a second constant thickness along a width of the second portion that is perpendicular to the longitudinal length of the spacer that is greater than the first constant thickness,
wherein the fiber structure is made by weaving between a plurality of layers of warp yarns extending in a longitudinal direction of the fiber texture, the warp yarns or strands being interlinked by weft yarns extending in a transverse direction of the fiber texture, and wherein, in each winding turn with interposition of said spacer, the warp yarns present in each layer of warp yarns extending in both said at least one portion of extra thickness of the fiber texture and outside said at least one portion of extra thickness of the fiber texture lie at a same level in a thickness direction of the fiber structure.

2. The method according to claim 1, wherein a spacer element is interposed between the adjacent turns of the fiber texture on the mandrel, the spacer element extending over the entire width of the fiber texture.

3. The method according to claim 1, wherein the spacer element is constituted by a cellular structure.

4. The method according to claim 3, wherein the cellular structure is made of a deformable material.

5. The method according to claim 4, wherein the deformable material is constituted by embossed rubber.

6. The method according to claim 4, wherein the deformable material is constituted by paper or card including an impermeable coating layer.

7. The method according to claim 3, wherein the cellular structure is made of metal material and wherein each face of the cellular structure is covered by a skin of deformable material.

8. The method according to claim 1, wherein each spacer element is constituted by a textile strip.

9. The method according to claim 8, wherein each textile strip is woven at the same time as the fiber texture.

10. The method according to claim 8, wherein each textile strip presents a weave that is the same as the weave of the fiber texture.

11. The method according to claim 1, wherein the portions presenting extra thickness are full of fiber texture.

* * * * *